(12) United States Patent
Greene et al.

(10) Patent No.: US 10,384,338 B2
(45) Date of Patent: Aug. 20, 2019

(54) ROBOTIC VEHICLE HAVING EXTENDABLE MANDIBLE STRUCTURE

(71) Applicant: Cardinal Gibbons High School, Raleigh, NC (US)

(72) Inventors: Sean Michael Greene, Raleigh, NC (US); Benjamin Gerard Gravel, Cary, NC (US); Aaron Joseph Ruff, Apex, NC (US); Sean Michael McDonald, Cary, NC (US); Brian Alexander Nelson, Cary, NC (US); Austin Laboy Schick, Cary, NC (US); Colin Daniel Russell, Cary, NC (US)

(73) Assignee: CARDINAL GIBBONS HIGH SCHOOL, Raleigh, NC (US)

( * ) Notice: Subject to any disclaimer, the term of this patent is extended or adjusted under 35 U.S.C. 154(b) by 1110 days.

(21) Appl. No.: 14/225,223

(22) Filed: Mar. 25, 2014

(65) Prior Publication Data
US 2015/0273687 A1    Oct. 1, 2015

(51) Int. Cl.
| | |
|---|---|
| *B25J 9/16* | (2006.01) |
| *B25J 5/00* | (2006.01) |
| *B25J 15/00* | (2006.01) |
| *B25J 15/02* | (2006.01) |
| *B25J 15/08* | (2006.01) |
| *B25J 18/02* | (2006.01) |

(52) U.S. Cl.
CPC .......... *B25J 5/007* (2013.01); *B25J 15/0038* (2013.01); *B25J 15/024* (2013.01); *B25J 15/086* (2013.01); *B25J 18/025* (2013.01); *Y10S 901/01* (2013.01); *Y10S 901/32* (2013.01); *Y10S 901/36* (2013.01)

(58) Field of Classification Search
USPC ............................................... 414/734; 901/1
See application file for complete search history.

(56) References Cited

U.S. PATENT DOCUMENTS

| | | | | |
|---|---|---|---|---|
| 3,760,956 | A * | 9/1973 | Burch | B25J 5/02 212/203 |
| 4,091,943 | A * | 5/1978 | Bay-Schmith | A01D 90/08 414/555 |
| 4,210,219 | A * | 7/1980 | Oswald | B60B 37/00 180/24.12 |
| 4,354,836 | A * | 10/1982 | Santoni | A61C 19/045 433/43 |
| 4,636,137 | A * | 1/1987 | Lemelson | B25J 5/005 348/114 |
| 5,281,079 | A * | 1/1994 | Lemelson | B23Q 41/00 29/26 A |
| 5,347,987 | A * | 9/1994 | Feldstein | A61B 1/042 348/65 |

(Continued)

*Primary Examiner* — Michael S Lowe
(74) *Attorney, Agent, or Firm* — Haynes and Boone, LLP

(57) ABSTRACT

A robotic vehicle is provided with an extendable arm and a mandible structure. The mandible structure includes a pair of mandibles with toothed portions that cooperatively engage such that the mandibles may be opened and closed by applying a force to only one of the pair of mandibles. The mandible structure hangs freely from the extendable arm and is balanced so that the mandible structure naturally maintains a substantially vertical orientation. In the closed position, the mandible structure defines an interior cavity suitable for securely grasping a ring.

10 Claims, 6 Drawing Sheets

(56) References Cited

U.S. PATENT DOCUMENTS

| | | | | |
|---|---|---|---|---|
| 5,354,150 A * | 10/1994 | Canales | ................ | B23P 19/061 166/77.52 |
| 5,672,044 A * | 9/1997 | Lemelson | ............... | B66C 23/00 414/744.3 |
| 6,217,094 B1 * | 4/2001 | Hanaduka | ............. | B25J 13/088 294/106 |
| 7,476,072 B2 * | 1/2009 | Tamura | ................... | B25J 9/023 269/55 |
| 7,618,230 B2 * | 11/2009 | Sallen Rosello | .. | B62D 49/0678 414/680 |
| 7,860,614 B1 * | 12/2010 | Reger | ................... | B25J 9/1671 700/10 |
| 8,752,876 B2 * | 6/2014 | Niekamp | .................. | E02D 7/06 294/106 |
| 9,139,402 B2 * | 9/2015 | Dodge, IV | .............. | B66C 1/445 |
| 2007/0020082 A1 * | 1/2007 | Caveney | .......... | H01L 21/67766 414/744.5 |

* cited by examiner (Not to scale)

ROBOTIC VEHICLE HAVING EXTENDABLE MANDIBLE STRUCTURE

BACKGROUND OF THE INVENTION

The present invention generally relates to robotic arms and, in a representatively illustrated embodiment thereof, more particularly relates to a specially designed extendable mandible structure for a robotic vehicle.

In the construction of small robotic vehicles which manipulate objects, one of the design challenges presented is to provide the vehicle with the robotic arm capable of securely manipulating smooth-surfaced rings. It has been found that attempting to grab a smooth surfaced ring by pinching it with two fingers at one point along the ring is unworkable. The smooth surface of the ring can cause the ring to slip out from between the fingers.

In view of these design difficulties it can be seen that a need exists for a mandible structure for a vehicle, such as a robotic vehicle, that provides the vehicle with enhanced ability to manipulate smooth surfaced rings. It is to this need that the present invention is primarily directed.

DETAILED DESCRIPTION

Figure 1:
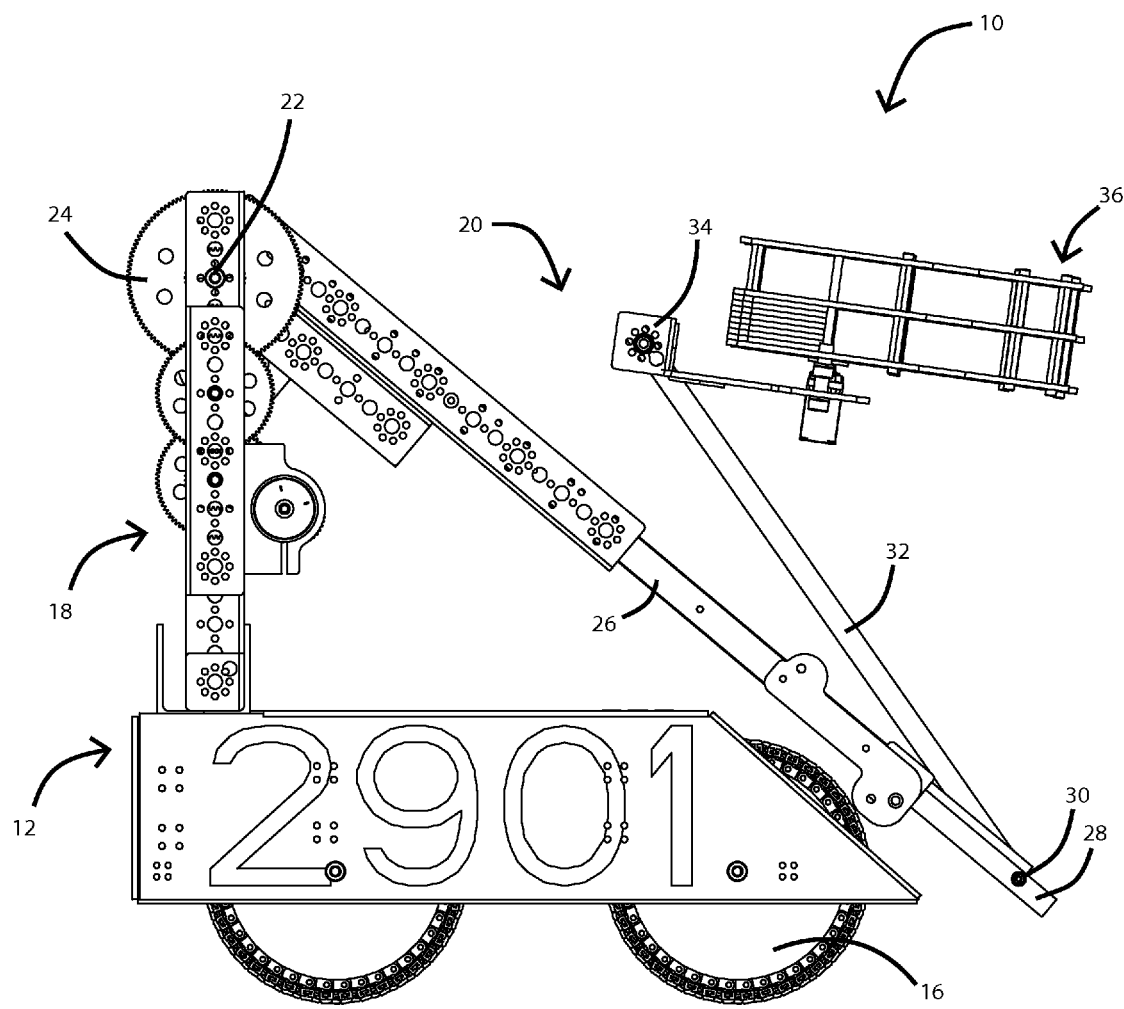
FIG. 1 is a side view of an illustrative robotic vehicle provided with specially designed mandible structure embodying principles of the present invention.

Illustrated in FIG. 1 is a robotic vehicle 10 having a rectangular frame portion 12 rollingly supported by a plurality of treaded wheels 16 (representatively four in number) embodying principles of the present invention. The treaded wheels are advantageously of the type described in co-pending application Ser. No. 13/588,531, whose subject matter is hereby incorporated by reference for all purposes. Rising from the frame portion 12 is a mast 18. The mast 18 supports a highly manipulable arm 20, which is attached to the mast at a pivot point 22. Axially aligned at pivot point 22 is a gear 24. The arm 20 may be rotated about the pivot point 22 to adjust its vertical elevation by activating an electric motor (not shown) to turn gear 24. Advantageously, the reduction transmission is used to drive the gear 24 such that a small and inexpensive electric motor can provide the high torque needed to raise and lower the armed 20. The reduction transmission also provide stability such that the arm 20 will naturally retain any position to which it is set, without slowly falling due to the pull of gravity.

The arm 20 includes an extendable structure comprising an outside frame 26 and an inside frame 28, commonly referred to as a linear slide. Inside frame 28 is arranged to securely slide longitudinally in a track provided by outside frame 26. A rope and pulley system is used to control the extension of the inside frame 28. Advantageously, the ropes used to manipulate the extension of inside frame 28 loop around pivot point 22 and wound around an axle connected to an electric motor on mast 18. Locating the drive motor for controlling the extension of inside frame 28 on the mast 18 reduces the weight of arm 20.

Coupled the inside frame 28 of pivot point 30 is flip-out arm 32. A string tethered to flip out arm 32 allows the flip out arm 32 to be pulled into linear alignment with outside frame 26 and inside frame 28. The string is preferably connected to an electric motor or servo on mast 18.

On the flip out arm 32, at the end opposite to pivot point 30, is a mandible structure 36 that freely swings about wrist pivot 34. The structure of mandible structure 36 is further explained below.

In one embodiment, the entire robotic vehicle 10 as illustrated in FIG. 1 is dimensioned to fit within a cube measuring 18 inches per side.

Figure 2:
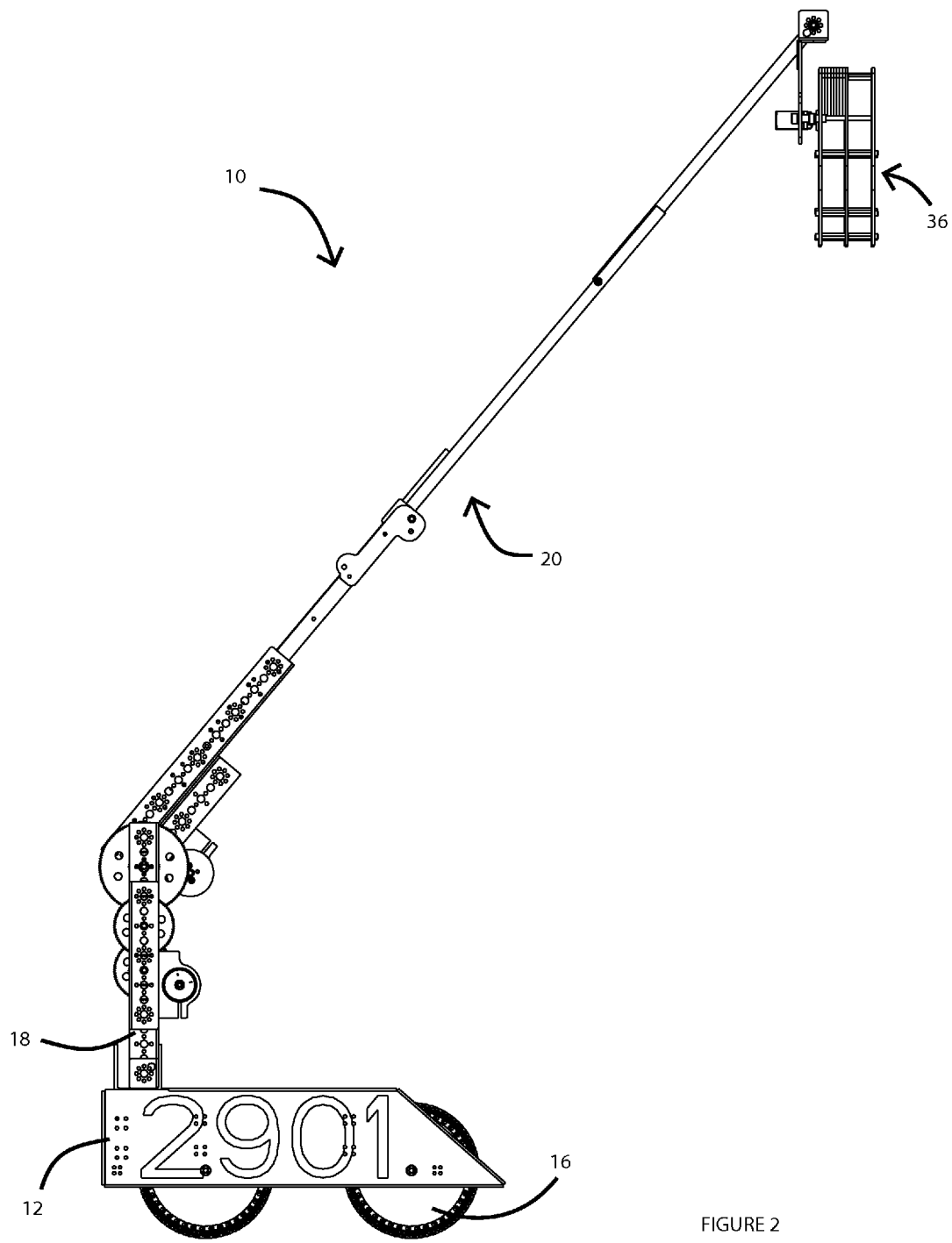
FIG. 2 is a side view of an illustrative robotic vehicle showing in arm in an extended position.

Turning now to FIG. 2, illustrated is the same robotic structure as in FIG. 1 but now with flip out arm 32 linearly aligned with inside frame 28 and with the inside frame 28 in its extended position. The arm 20 has been partially raised by pivoting about pivot point 22. The mandible structure 36 hangs freely from the wrist pivot 34. As shown, the mandible structure 36 is balanced such that it hangs substantially vertically. In this way, the mandible structure automatically positions itself appropriately to grasp rings which may be hanging from a peg.

In one embodiment, the robotic vehicle 10 is full of lifting the mandible structure 36 and retrieving a ring from a peg more than 5 feet in the air.

Figure 3:
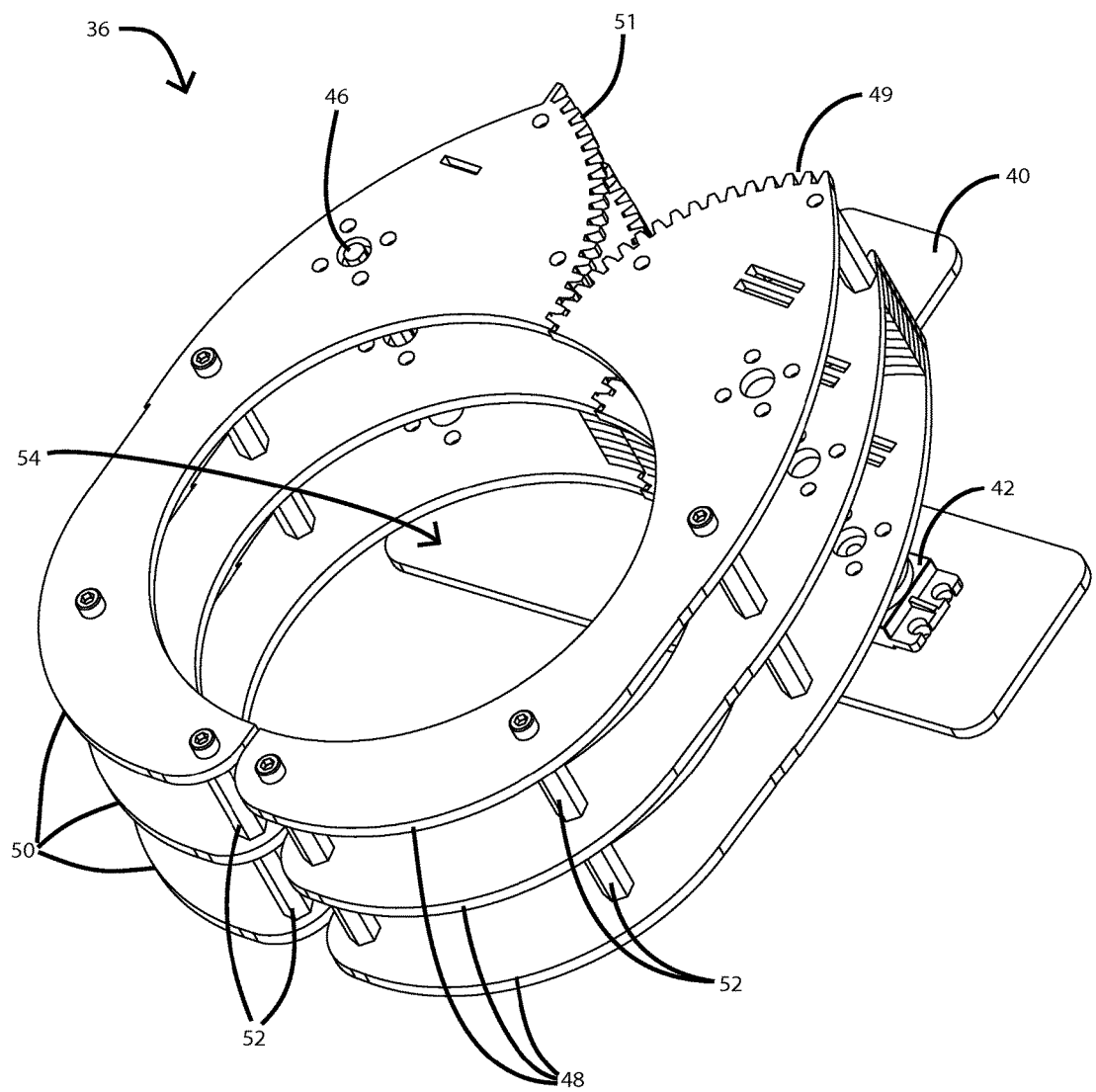
FIG. 3 is a perspective view of a mandible structure in the closed position.

Turning now to FIG. 3, illustrated is a detailed perspective view of the mandible structure 36. The mandible structure 36 includes a base plate 40. The base plate 40 is a substantially T-shaped plate and is preferably cut from a flat plastic material, such as Lexan. Secured to the backside of base plate 40 is a servo motor 42. The servo motor 42 is coupled to base plate 40 and to a set of right-side mandibles 48. An axle 46 is positioned on the base plate 40 opposite the servo motor 42. Coupled to the axle 46 are a set of left-side mandibles 50.

Each right side mandible 50 is a minor image of each left side mandible 48. The mandibles are generally a semicircular design such that a right side mandible and the left side mandible together (in the closed position illustrated in FIG. 3) define a generally circular opening. Each mandible has a toothed portion at one end and a pincer portion at the opposite end. The toothed portions 49,51 of the right- and left-side mandibles 48 and 50 are cut so that they mesh together as the mandibles rotate about the axle 46 and servo motor 42, respectively. Thus the toothed portion is analogous to an arc of a gear whose centerpoint is at the location of the axle. The mandibles are preferably cut from a lightweight plastic, such as Lexan.

In the illustrated embodiment, there are three right-side mandibles 48 and three left-side mandibles 50. In general, the number of left side mandibles and right side mandibles should be equal, but more or fewer mandibles are possible. Increasing the number of mandibles allows the mandible structure 36 to grip a greater number of rings simultaneously. With the number of mandibles shown in FIG. 3, the mandible structure 36 is capable of grasping two rings simultaneously.

The left- and right-side mandibles 48 and 50 are spaced apart along axle 44 and away from servo 42 using spacers 52. In addition to spacers 52, toothed spacers 53 may optionally be employed to provide spacing and additional gear engagement along the toothed portions of the right-side and left-side mandibles 48 and 50. The spacers 52, toothed spacers 53 and any two adjacent left- and right-side mandibles 48 and 50 roughly define an interior cavity 54 suitable for securely grasping and storing a ring. Thus the mandible structure 36 includes space for a ring in the interior cavity 54 defined by the bottom left-side mandibles 48, middle left-side mandible 48, the spacers between the bottom and middle left-side mandibles, bottom right-side mandible 50, middle right-side mandible 50, and the spacers between the bottom and middle right-side mandibles. Similarly, the mandible structure 36 includes a space for a ring in the interior cavity 54 defined by the middle left-side mandible 48, top left-side mandible 48, the spacers between the middle and top left-side mandibles, middle right-side mandible 50, top right side mandible 50, and the spacers between the middle and top right-side mandibles.

Figure 4:
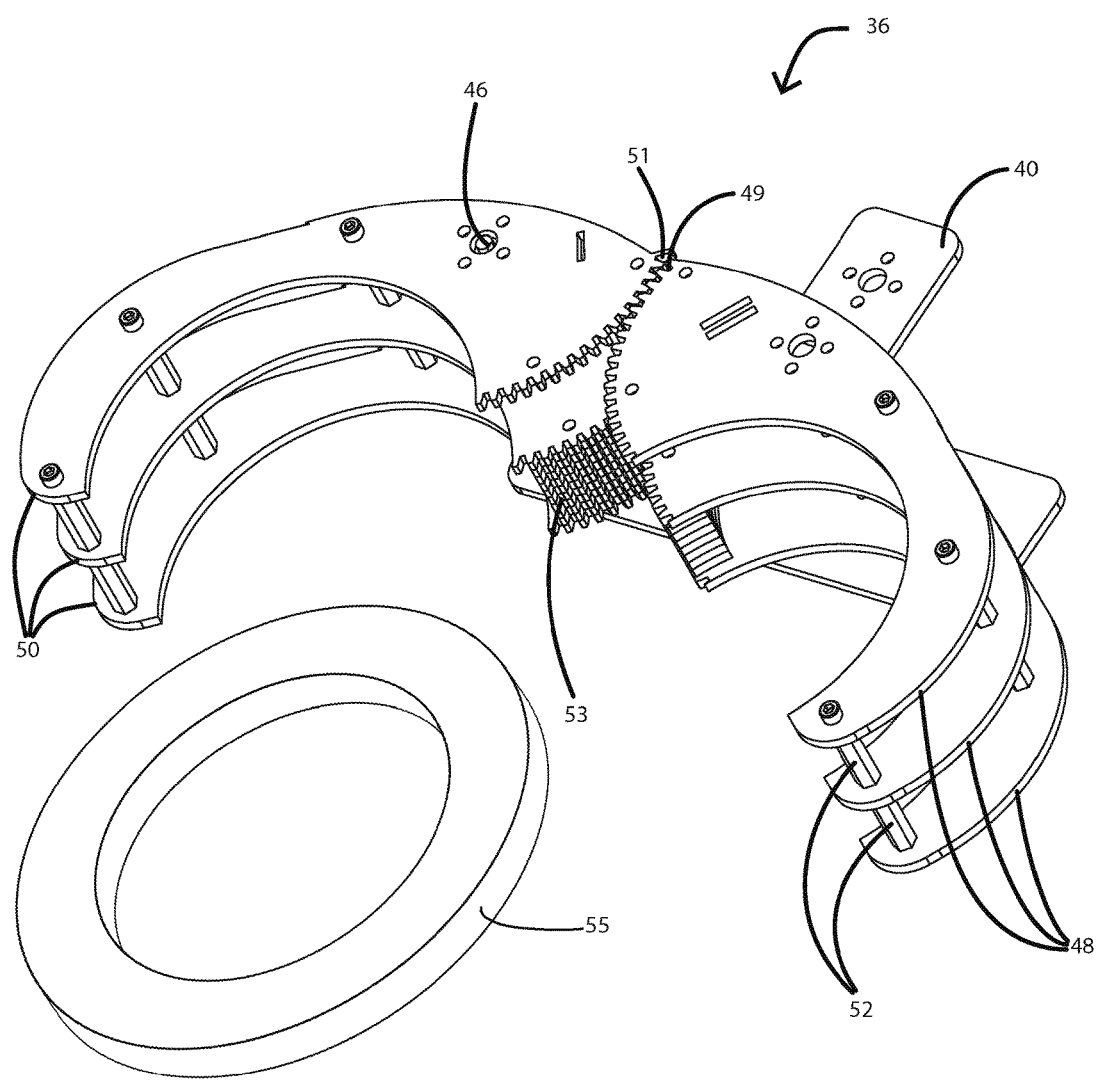
FIG. 4 is a perspective view of a mandible structure in the open position.
Figure 5:
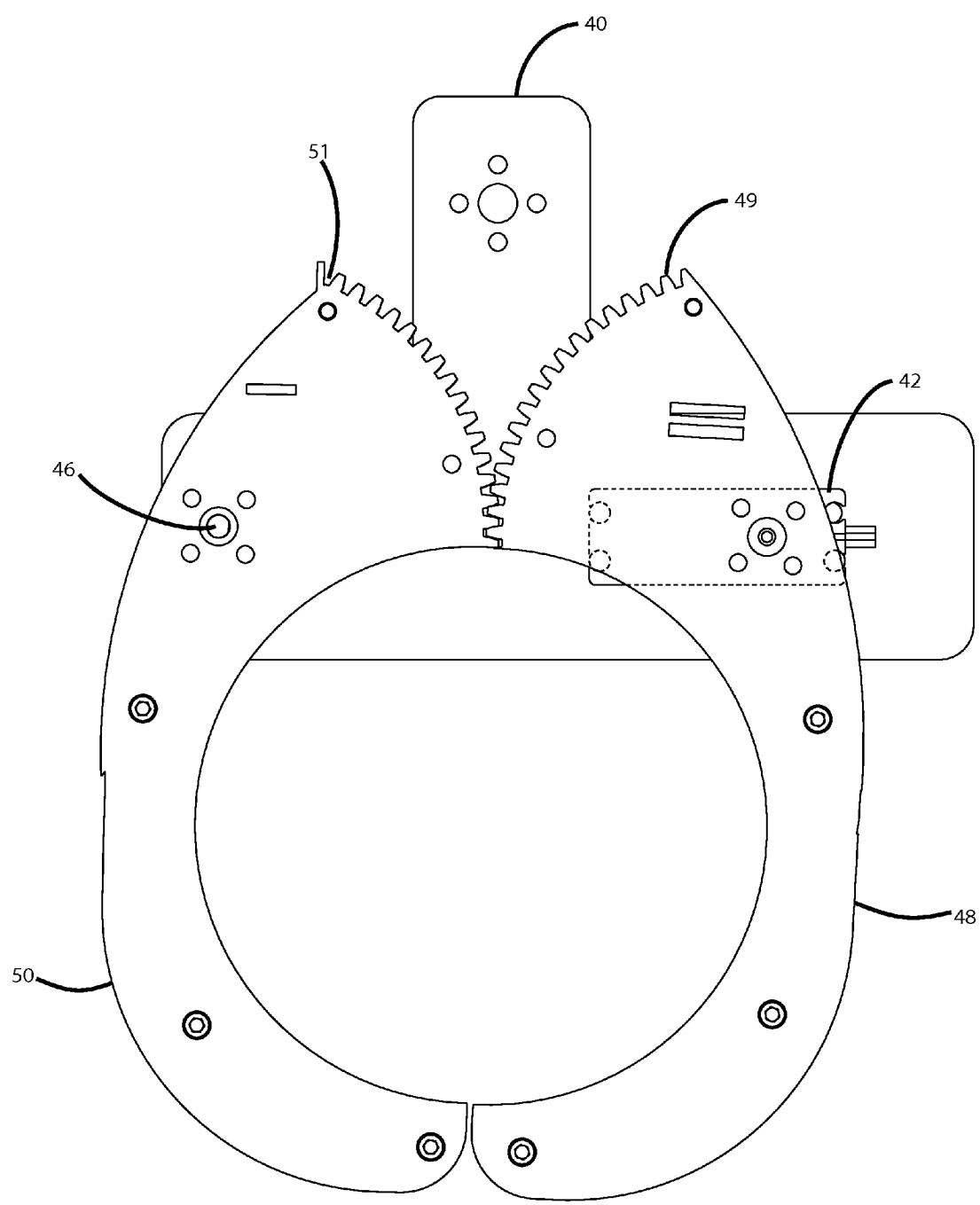
FIG. 5 is a top view of a mandible structure in the closed position.
Figure 6:
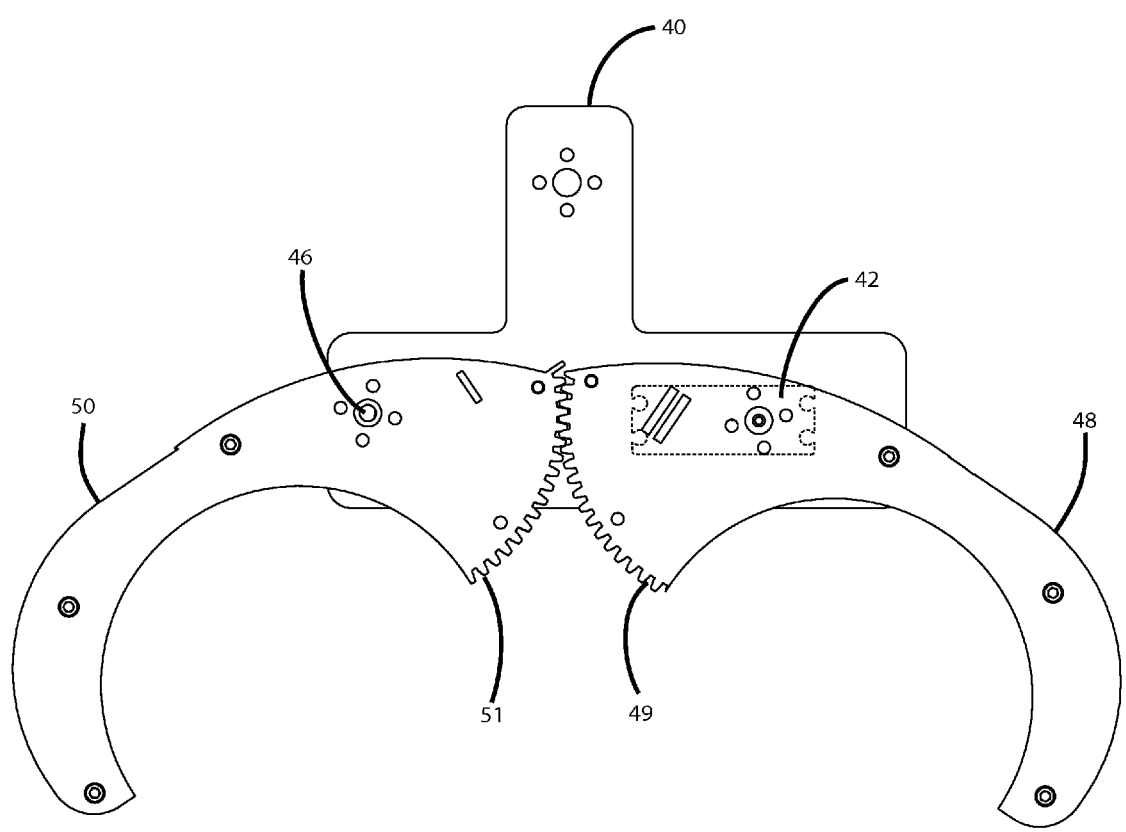
FIG. 6 is a top view of a mandible structure in the open position.

As previously noted, the right side mandibles 48 are coupled to servo motor 42. Thus, as the servo motor 42 turns, the right side mandibles rotate around the axis of the servo. The toothed portions of right side mandibles 48 engage with the toothed portions of the left side mandibles 50, causing the left side mandibles 52 similarly rotate about axle 46. As the right side mandibles 48 and the left side mandibles 50 rotate about their respective axis, the pincer portions of the mandibles move apart and the interior cavity 54 expands. The mandible structure 36 in the open position in FIG. 4. By turning the servo motor 42 in the opposite direction, the right side mandibles 48 and the left side mandibles 50 again rotate about their respective axis but in an opposite direction, bringing the pincer portions back together and enclosing the interior 54.

By selectively opening and closing the mandible structure 36, in combination with moving the vehicle 10, an operator is able position the mandible structure 36 around one or more rings. When the mandible structure 36 is closed around a ring positioned within the interior cavity 54, the mandible structure 36 securely grasps and stores the ring such that the ring cannot slip out. Because the mandible structure 36 completely envelops the ring, the mandible structure 36 can grasp very smooth surfaced rings that would be difficult to grasp by pinching them at a single location about the ring.

The foregoing detailed description is to be clearly understood as being given by way of illustration and example only, the spirit and scope of the present invention being limited solely by the appended claims.

What is claimed is:
1. A robotic apparatus comprising:
a base plate attached to and hanging from a pivot point;
a plurality of mandibles attached on one side of the base plate;
a motor attached on an opposite side of the base plate from the plurality of mandibles, the motor operable to open and close the mandibles;
wherein the weight of the plurality of mandibles and the weight of the motor are substantially balanced such that the plurality of mandibles hang in a substantially vertical position when the base plate is supported solely from the pivot point.
2. The robotic apparatus of claim 1 wherein:
the plurality of mandibles is spaced apart using spacers.
3. The robotic apparatus of claim 2 wherein:
the plurality of mandibles are spaced apart to define a cavity for securely holding a ring.
4. The robotic apparatus of claim 1 wherein:
the base plate hangs from an arm attached to a movable platform.
5. The robotic apparatus of claim 1 wherein:
the plurality of mandibles includes a plurality of left side mandibles and a plurality of right side mandibles.
6. The robotic apparatus of claim 5 wherein:
the plurality of left side mandibles include teeth that engage with teeth on the plurality of right side mandibles.
7. The robotic apparatus of claim 6 wherein:
the plurality of mandibles can be opened and closed by applying a force to only one selected from the group comprising: the left side mandibles and the right side mandibles.
8. The robotic apparatus of claim 6 wherein:
the teeth on the left side mandibles are arranged in a circumferential arc whose centerpoint defines an axis of rotation of the left side mandibles, and
the teeth on the right side mandibles are arranged in a circumferential arc whose centerpoint defines an axis of rotation of the right side mandibles.
9. The robotic apparatus of claim 1 wherein:
the motor is a servo motor.
10. An apparatus comprising:
a means for grasping a ring;
a means for raising and lowering the means for grasping;
a means for moving the means for raising and lowering.

* * * * *